(12) United States Patent
Tsuchida (10) Patent No.: US 8,077,578 B2
(45) Date of Patent: Dec. 13, 2011

(54) RECORDING APPARATUS AND BROADCAST RECEIVING APPARATUS

(75) Inventor: Shunichi Tsuchida, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/976,694

(22) Filed: Dec. 22, 2010

(65) Prior Publication Data

US 2011/0090634 A1   Apr. 21, 2011

Related U.S. Application Data

(63) Continuation of application No. 12/350,122, filed on Jan. 7, 2009, now abandoned.

(30) Foreign Application Priority Data

Feb. 28, 2008 (JP) ................. 2008-048651

(51) Int. Cl.
*G11B 19/02* (2006.01)
(52) U.S. Cl. ........................................... 369/69
(58) Field of Classification Search ............ 360/69, 360/63, 68, 273
See application file for complete search history.

(56) References Cited

U.S. PATENT DOCUMENTS

| 6,771,495 | B2 | 8/2004 | Fujiwara et al. | |
|---|---|---|---|---|
| 6,822,823 | B1 | 11/2004 | Tsuwako et al. | |
| 7,167,360 | B2 | 1/2007 | Inoue et al. | |
| 7,315,447 | B2 | 1/2008 | Inoue et al. | |
| 7,487,520 | B2 | 2/2009 | Omori et al. | |
| 7,522,483 | B2 | 4/2009 | Omori et al. | |
| 7,911,776 | B2 * | 3/2011 | Ikeda et al. | 361/679.33 |
| 2004/0052202 | A1 | 3/2004 | Brollier | |
| 2004/0246825 | A1 * | 12/2004 | Shen | 369/30.27 |
| 2005/0168929 | A1 | 8/2005 | Inoue et al. | |
| 2009/0073649 | A1 * | 3/2009 | Ikeda et al. | 361/679.35 |
| 2009/0084846 | A1 | 4/2009 | Ashizaki et al. | |
| 2010/0148939 | A1 | 6/2010 | Yamada et al. | |

FOREIGN PATENT DOCUMENTS

| CN | 1652246 | 8/2005 |
|---|---|---|
| JP | 2000-311477 | 11/2000 |
| JP | 2001-130643 | 5/2001 |
| JP | 2002-032979 | 1/2002 |
| JP | 2002-352575 | 12/2002 |
| JP | 2003-233981 | 8/2003 |
| JP | 2005-222583 | 8/2005 |
| JP | 2005-222585 | 8/2005 |
| JP | 2007-241524 | 9/2007 |
| JP | 2008-027562 | 2/2008 |

OTHER PUBLICATIONS

State Intellectual Property Office of P.R.C. Application No. 200910006226.1, Notification of the First Office Action, mailed Apr. 22, 2010. (English Translation).
Japanese Patent Application No. 2009-234482, Notice of Reason for Refusal, mailed May 10, 2011, (English Translation).

* cited by examiner

*Primary Examiner* — Allen T Cao
(74) *Attorney, Agent, or Firm* — Blakley, Sokoloff, Taylor & Zafman LLP (57) ABSTRACT

According to one aspect of the embodiment, a recording apparatus includes: a recording medium unit having a metal face; a control circuit configured to operate the recording medium unit; a connector electrically connected to the control circuit and configured to transfer data between an external apparatus and the recording medium unit; and a metal portion disposed in a vicinity of the connector and electrically connected to the metal face.

24 Claims, 10 Drawing Sheets

FIG. 12C

RECORDING APPARATUS AND BROADCAST RECEIVING APPARATUS

CROSS-REFERENCE TO RELATED APPLICATIONS

This application claims the benefit of priority on U.S. patent application Ser. No. 12/350,122 filed Jan. 7, 2009, which is based upon and claims the benefit of priority from Japanese Patent Application No. 2008-048651, filed Feb. 28, 2008, the entire contents of which are incorporated herein by reference.

BACKGROUND

1. Field

The present invention relates to a recording apparatus in which a recording medium and a housing for accommodating the recording medium are integrated with each other, and a broadcast receiving apparatus comprising the recording apparatus.

2. Description of the Related Art

A hard disk drive (hereinafter, referred to as HDD) which is a large capacity recording medium unit is widely used for storing digital data of a large capacity such as a video image and music. Such HDDs include an internal HDD which is installed in an apparatus body, and an external HDD which is to be connected to an apparatus body through a predetermined connecting cable.

Recently, a small HDD according to the standard called as iVDR (Information Versatile Disk for Removable usage) has been proposed. The iVDR standard is a standard for removable hard disks, and attracts attention because of the utilization thereof in various fields such as home electric appliances, AV equipment, and vehicle equipment, in addition to personal computers. In the current iVDR standard, a serial ATA connector (hereinafter, referred to as SATA connector) is disposed, and data transfer between an HDD and an external apparatus is performed via the SATA connector.

Exemplary utilization of such a small HDD is the recording of television broadcast programs. A television broadcast receiving apparatus having a function of recording a television broadcast program into a small removable HDD is known. In such a television broadcast receiving apparatus, when the capacity of an internal HDD is not enough, a removable HDD such as a cassette can easily increase the capacity. For example, respective persons of a family can have own HDDs.

For example, JP-A-2007-241524 below discloses an HDD having a shape according to the iVDR standard (see FIG. 1 of JP-A-2007-241524).

In an HDD having the conventional structure, there is a disadvantage in that a control circuit for controlling the recording and reproduction of the HDD, and the like may be easily broken by unexpected static electricity.

SUMMARY OF THE INVENTION

According to an aspect of the present invention, there is provided a recording apparatus including: a recording medium unit having a metal face; a control circuit configured to operate the recording medium unit; a connector electrically connected to the control circuit and configured to transfer data between an external apparatus and the recording medium unit; and a metal portion disposed in a vicinity of the connector and electrically connected to the metal face.

According to another aspect of the present invention, there is provided a broadcast receiving apparatus including: a receiver configured to receive broadcast signal; and a recorder configured to record the broadcast program provided by the broadcast signal, the recording apparatus comprising: a recording medium unit having a metal face; a control circuit configured to operate the recording medium unit; a connector electrically connected to the control circuit and configured to transfer data between an external apparatus and the recording medium unit; and a metal portion disposed in a vicinity of the connector and electrically connected to the metal face.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
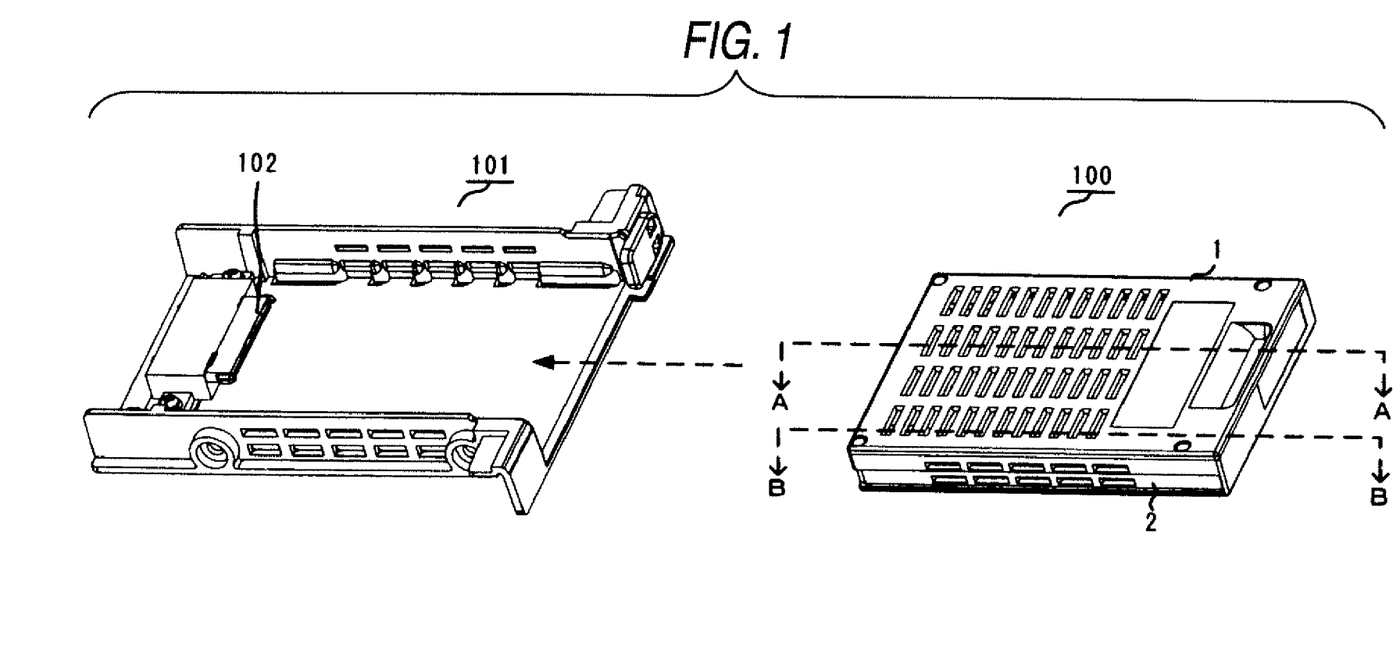
FIG. 1 is an exemplary schematic view illustrating an external appearance of a recording apparatus of a first embodiment and an external apparatus to which the recording apparatus is attached.
Figure 2:
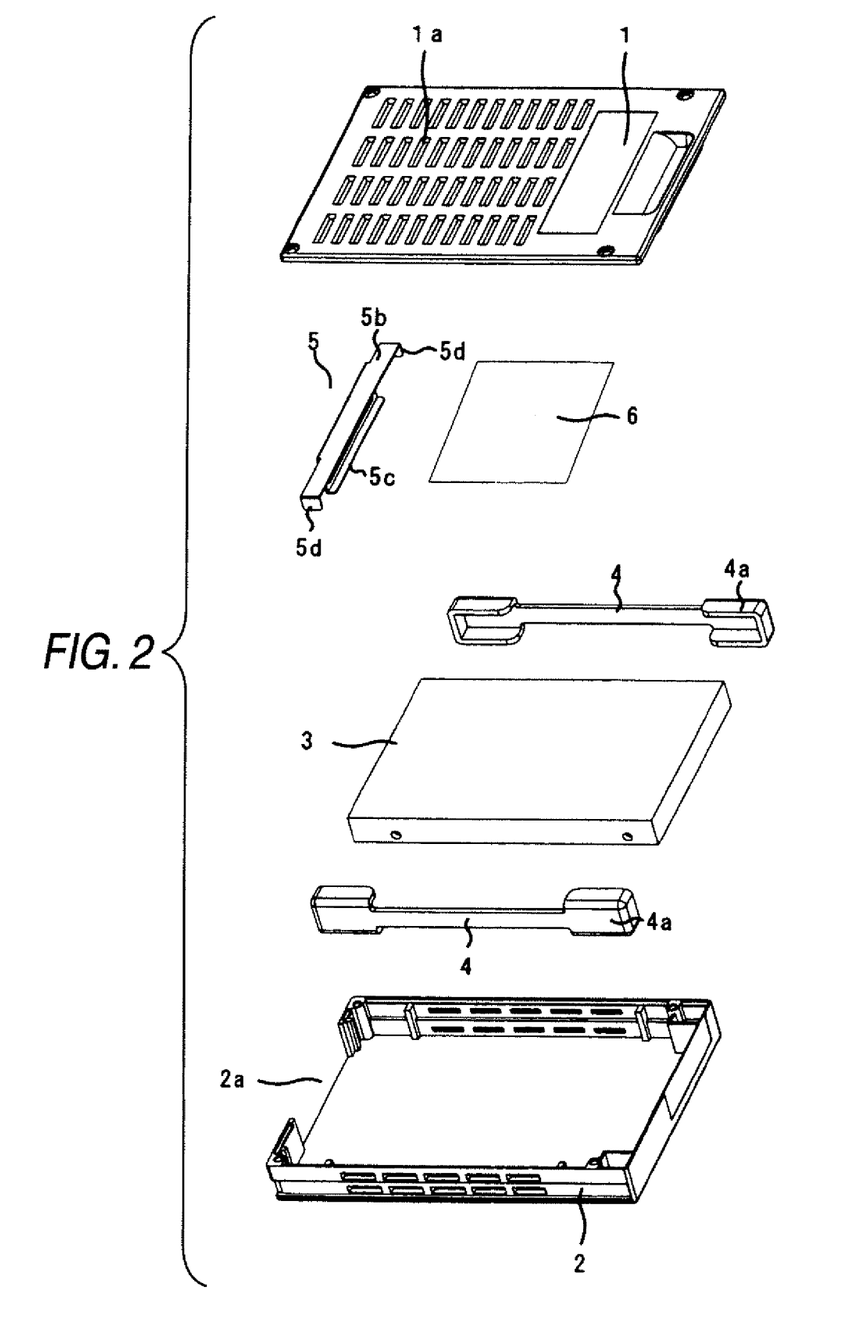
FIG. 2 is an exemplary exploded view of the recording apparatus of the first embodiment.

Hereinafter, a first embodiment of the invention will be described with reference to the accompanying drawings. FIG. 1 schematically shows an external appearance of a recording apparatus 100 which will be described in the first embodiment, and a cartridge 101 to which the recording apparatus 100 is detachably attached. For example, the cartridge 101 is installed in a display apparatus such as a television set. FIG. 2 schematically shows an exemplary exploded view of the recording apparatus 100.

The recording apparatus 100 has a parallelepiped shape as shown in FIG. 1. As shown in FIG. 2, the recording apparatus 100 mainly includes an upper housing 1, a lower housing 2, an HDD unit 3, shock-absorbing members 4, a metal plate 5, and a conductive member 6.

Figure 3A:
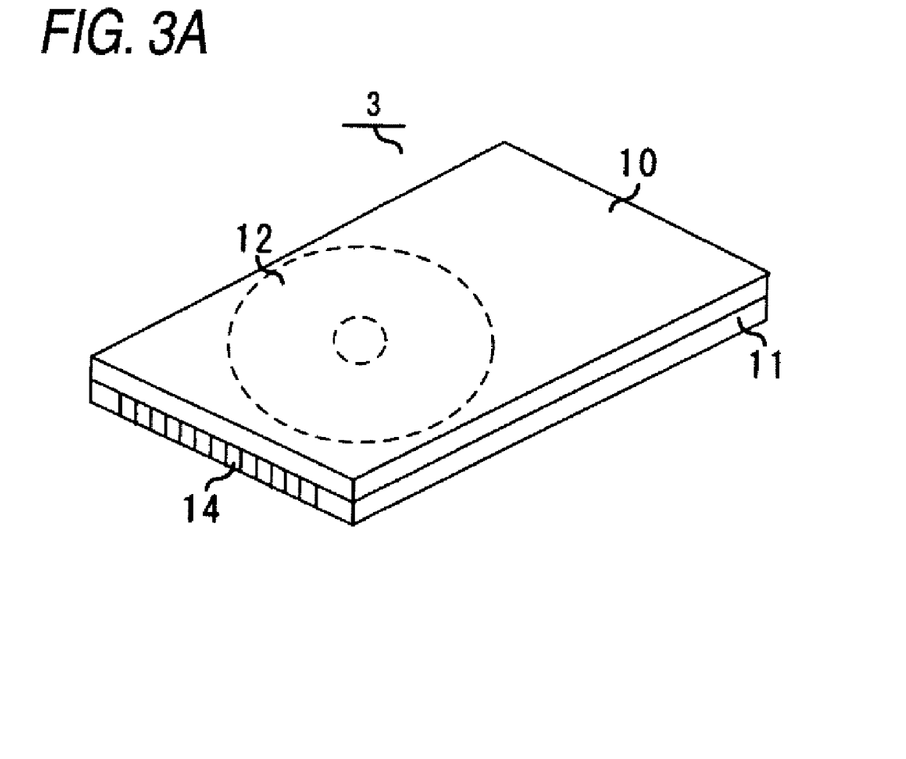
FIGS. 3A and 3B are exemplary views showing an HDD unit in the embodiment.
Figure 3B:
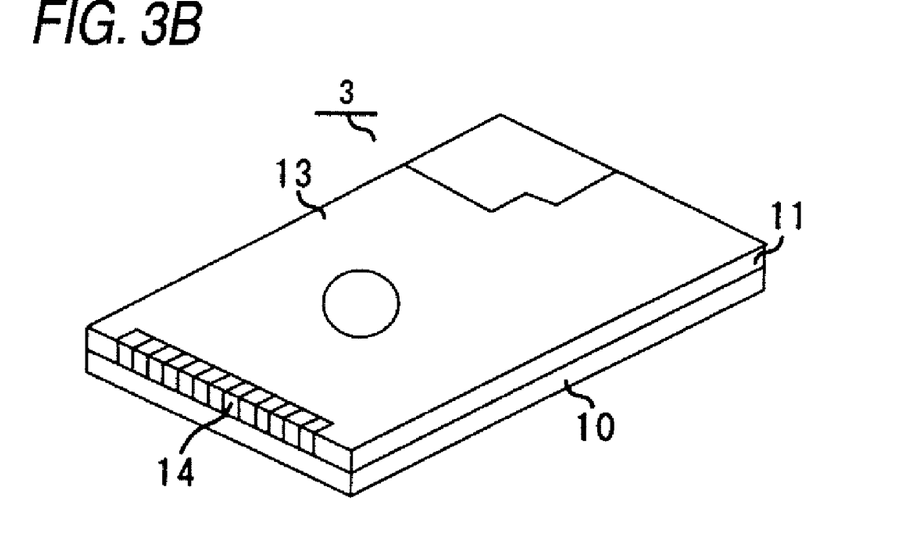

The upper housing 1 and the lower housing 2 constitute a case for accommodating and protecting the HDD unit 3, the shock-absorbing members 4, the metal plate 5, and the conductive member 6, and are made of a material such as plastic. The upper housing 1 is a housing for covering a face on the side where a top cover 10 of the HDD unit 3 is placed (see FIG. 3), and preferably provided with a plurality of slits 1a. Heat generated in the HDD unit 3 during the operation of the recording apparatus 100 is dissipated from the side of the top cover 10 to the outside, so that the heat radiating property is improved.

The lower housing 2 is a housing for covering side faces of the HDD unit 3 and a face on the side where a base chassis 11 is disposed (see FIG. 3). In one of the shorter side faces of the lower housing 2, an opening 2a which is to be connected to a connector of an external apparatus (for example, a connector 102 of the cartridge 101 shown in FIG. 1) is formed. Specifically, a connector 14 (see FIG. 3) of the HDD unit 3 is exposed to the outside through the opening 2a, so that the connector 14 is connected to the connector of the external apparatus via the opening 2a. After the HDD unit 3, the shock-absorbing member 3, and the like are accommodated, the upper housing 1 and the lower housing 2 are integrated with each other as shown in FIG. 1 by means of, for example, screwing.

The HDD unit 3 is a unit for performing and controlling the recording/reproduction of data. As shown in FIGS. 3A and 3B, the HDD unit includes the top cover 10 in which the surface is covered with a metal material such as aluminum die cast, and the base chassis 11 which is similarly formed by a metal material such as aluminum die cast. In the HDD unit 3, for example, a plurality of magnetic disks 12 of about 1 to 3.5 inches, a plurality of heads for reading and writing data from and to the magnetic disks 12, and a driving portion (not shown) such as a motor for rotationally driving the magnetic disks 12 are placed in the inside on the side of the top cover 10.

On the other hand, on the side of the base chassis 11, a circuit board 13 is placed on which a number of semiconductor integrated circuits (control circuits) for controlling recording/reproduction of the HDD unit 3 are disposed. On the other shorter side face of the base chassis 11, the connector (for example, an SATA connector) is disposed. The connector is electrically connected to the semiconductor integrated circuits of the circuit board 13, and functions as an interface portion for performing data transfer between the external apparatus and the HDD unit 3. The connector 14 described herein is a connector as a portion exposed to the outside. In the actual usage, a conversion connector (for example, an iVDR connector) is mounted on the connector 14, and the conversion connector is sometimes used as the external interface. The top cover 10 and the base chassis 11 can be considered as a housing for covering and accommodating the recording medium unit body (such as the magnetic disks 12).

The shock-absorbing members 4 are constituted by including an elastic and flexible material such as natural rubber or a synthetic resin. The shock-absorbing members include holding portions 4a for clamping and fixing both the longer side faces of the HDD unit 3, at positions corresponding to respective edge portions of the HDD unit 3. The thus configured shock-absorbing members 4 clampingly hold the side faces of the HDD unit 3, so that the HDD unit 3 can be easily fixed in the housing, and the HDD unit 3 is prevented from being directly in contact with the upper housing 1 and the lower housing 2. Namely, the shock-absorbing members 4 have a principal function of reducing an impact on the housing from the outside to prevent the impact from being transmitted to the HDD unit 3.

Figure 4:
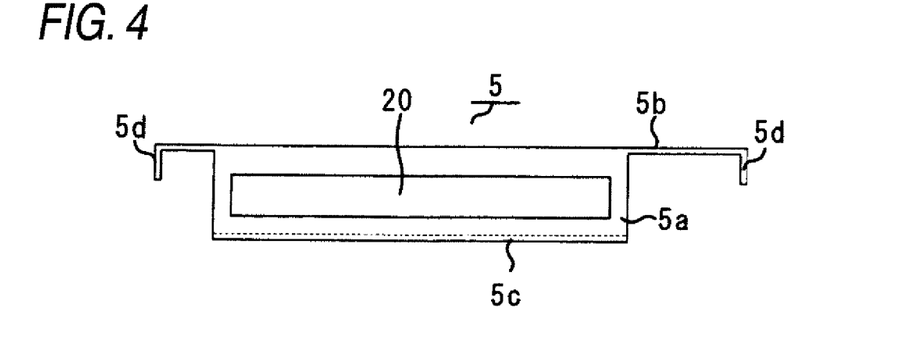
FIG. 4 is an exemplary front view showing a metal plate in the first embodiment.

As shown in FIGS. 2 and 4, the metal plate 5 configured by: a vertical plate 5a which is perpendicular to the principal surface of the HDD unit 3; a horizontal plate 5b which is continuous to an upper portion of the vertical plate 5a, and which is bent horizontally (i.e., in parallel to the principal surface of the HDD unit 3); and a horizontal plate 5c which is continuous to a lower portion of the vertical plate 5a, and which is bent horizontally. FIG. 4 is a front view of the metal plate 5.

In the vertical plate 5a, in order to enable the connection between the connector of the external apparatus and the HDD unit 3, as shown in FIG. 4, an opening 20 is formed at a position corresponding to the connector 14. The vertical plate 5a is formed so as to cover substantially the entire of the opening 2a of the lower housing, except the region corresponding to the connector 14. Accordingly, the connector 14 of the HDD unit 3 is exposed to the outside through the opening 2a and the opening 20. Thus, the connector 14 is connected to the connector of the external apparatus through the openings 2a, 20.

The vertical plate 5a and the horizontal plates 5b, 5c constitute a U-like shape when they are viewed from the lateral side. Therefore, the horizontal plates 5b, 5c clamp another member (the shock-absorbing members 4 in the embodiment) in the vertical direction, whereby the metal plate 5 can be prevented from being displaced in the housing in the vertical direction.

On the both ends of the vertical plate 5a, claw plates 5d which stand substantially perpendicularly to the vertical plate 5a are formed. Therefore, another member (for example, the holding portions 4a of the shock-absorbing members 4) is clamped by the claw plates 5d, or the claw plates 5d are fitted into fitting portions which are not shown, and which are disposed in the housing, thereby preventing the metal plate 5 from being displaced in the horizontal direction.

The conductive member 6 is a conductive member which is in contact with the metal plate 5 and the metal face of the HDD unit 3 (the top cover 10 in the embodiment), thereby electrically connecting them via the conductive member 6. Preferably, the conductive member includes a highly conductive material. An example of the conductive member 6 is a copper foil tape having a thickness of about 0.035 mm and containing copper. The conductive member is preferably flexible, because, when an impact is applied to the metal plate 5 from the outside, the impact is not transmitted to the HDD unit 3 via the conductive member 6. In the conductive member 6, for example, an adhesive material is applied to at least a part of one of the faces, and is used while the face onto which the adhesive material is applied is bonded to the metal plate 5 and the top cover portion 10. In the case where a tape-shaped member is used as the conductive member 6, it is preferred that the conductive tape is subjected to embossing, in order to ensure a larger contact area and to attain stable conductivity. A larger contact area is preferred in view of the heat radiation through the top cover 10.

Figure 5A:
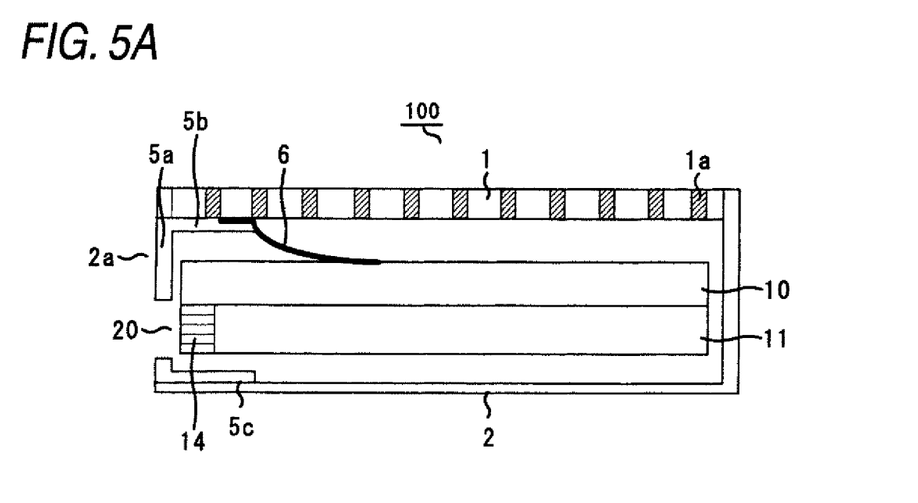
FIGS. 5A and 5B are exemplary sectional views illustrating the recording apparatus of the first embodiment.

Next, a sectional structure of the recording apparatus 100 will be described with reference to FIGS. 5A and 5B. FIG. 5A is a sectional view taken along the line A-A in FIG. 1, and FIG. 5B is a sectional view taken along the line B-B in FIG. 1.

As shown in FIG. 5A, the recording apparatus 100 of the embodiment comprises the metal plate 5 having the opening 20 so that the connector 14 is exposed to the outside, and the metal plate 5 and the metal face (the top cover 10) of the recording medium unit (the HDD unit 3) are electrically connected to each other through the conductive member 6.

Even when static electricity is generated in the vicinity of the connector 14 by, for example, bringing a finger of a human being closer to the connector, therefore, the static electricity is discharged to the metal face of the recording medium unit through the metal plate 5 and the conductive member 6. As described above, when static electricity is generated, the static electricity is not discharged to the internal circuit of the HDD unit 3 through the connector 14, because the surface of the top cover 10 has a lower resistive component as compared with the internal circuit in the circuit board 13, and the current is likely to flow to the side of the lower resistive component. Accordingly, the static electricity generated in the vicinity of the connector 14 is escaped to the side of the metal face of the outer circumference of the HDD unit 3. As compared with the conventional structure, therefore, it is possible to remarkably prevent the semiconductor integrated circuits of the recording medium unit from being electrostatically broken.

Figure 5B:
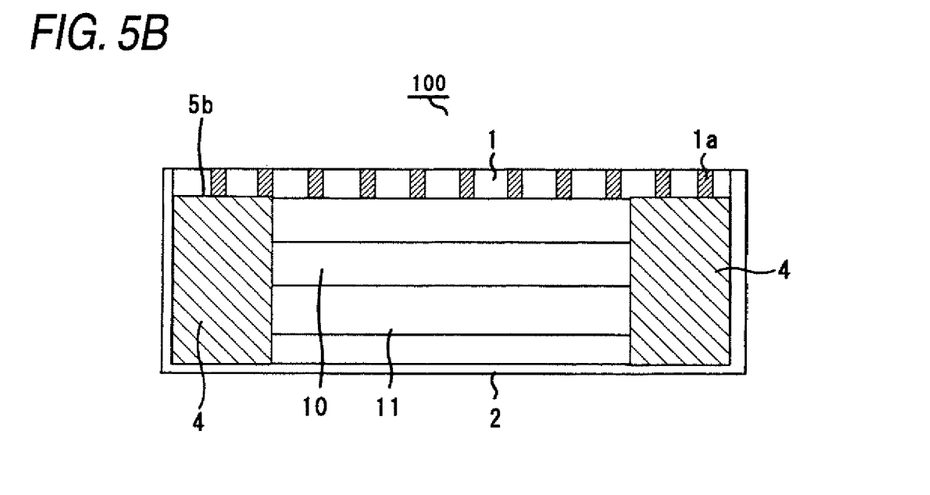

As shown in FIGS. 5A and 5B, the HDD unit 3 is accommodated in the housing in the state where the HDD unit is clamped by the shock-absorbing members 4, and the metal plate 5 is accommodated in the housing in the state where the claw plates 5d clamp the holding portions 4a of the respective shock-absorbing members 4. Accordingly, all of the upper housing 1, the lower housing 2, and the metal plate 5 are not in contact with the HDD unit 3, and are spaced by a predetermined distance. In addition, the conductive member 6 is preferably formed by a member having flexibility. Even when any impact is applied from the outside to the upper housing 1, the lower housing 2, and the metal plate 5, therefore, the impact is hardly transmitted to the HDD unit 3 in a direct manner. Consequently, a high impact resistance can be realized.

The recording apparatus 100 has the driving portion which performs high-speed rotation, so that heat is generated in accordance with the high-speed rotation of the driving portion. The top cover 10 of the HDD unit 3 is in contact with the conductive member 6. Accordingly, heat generated in the surface of the top cover 10 can be transmitted to the conductive member 6 and the metal plate 5, and released from them. Namely, a structure with a high heat radiation property can be attained. In the embodiment, the slits 1a are disposed in the housing on the side where the top cover 10 and the conductive member 6 are placed. Therefore, the heat radiation property can be further improved, and the reliability of the recording apparatus can be enhanced.

In the embodiment, it is particularly noted that the resistance to electrostatic breakdown and the heat radiation property can be improved by the relatively simple configuration without deteriorating the impact resistance of the recording apparatus. The metal plate 5 in the embodiment is accommodated in the housing, but alternatively the following configuration may be formed. Specifically, a part of the metal plate may be exposed from the housing to the outside, and static electricity may be discharged to the outside through the exposed portion of the metal plate (for example, a metal portion disposed on the outer surface of the upper housing 1 or the lower housing 2). As described above, the discharge may be alternatively performed from the metal plate 5 to a configuration other than the HDD unit 3 (for example, the upper housing 1, the lower housing 2, or an external apparatus on which the recording apparatus is installed).

Figure 6:
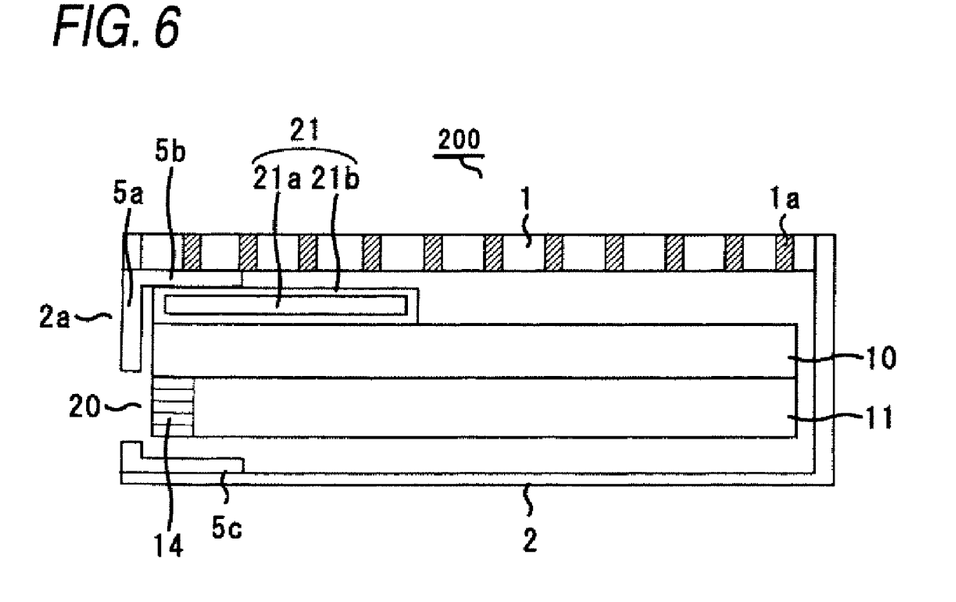
FIG. 6 is an exemplary sectional view illustrating a recording apparatus of a second embodiment.

Next, a recording apparatus 200 of a second embodiment of the invention will be described. FIG. 6 shows a sectional structure of the recording apparatus 200 in a position corresponding to a connector. The components which are similar to those in the recording apparatus 100 of the first embodiment are denoted by the identical reference numerals, and their description will be omitted.

In the recording apparatus 200 of the second embodiment, as shown in FIG. 6, as a conductive member which is electrically connected and interposed between the metal plate 5 and the metal face of the HDD unit 3 (the top cover 10), a gasket 21 is placed between the horizontal plate 5b and the top cover 10. Usually, a gasket is a fixing seal member used for providing a structure with air-tightness and water-tightness. In the embodiment, an electrically conductive gasket is employed. Specifically, the gasket 21 in the embodiment has a structure where a filler cushion material 21a such as urethane is covered with a thin metal plate 21b.

As described above, also in the recording apparatus 200 of the second embodiment, the metal plate 5 and the metal face (the top cover 10) of the recording medium unit (the HDD unit 3) are electrically connected to each other through the gasket 21.

Similarly with the first embodiment, even when static electricity is generated in the vicinity of the connector 14, therefore, the static electricity is discharged to the top cover 10 through the metal plate 5 and the gasket 6. Accordingly, it is possible to remarkably prevent the semiconductor integrated circuits of the recording medium unit from being electrostatically broken, as compared with the conventional structure.

Figure 7:
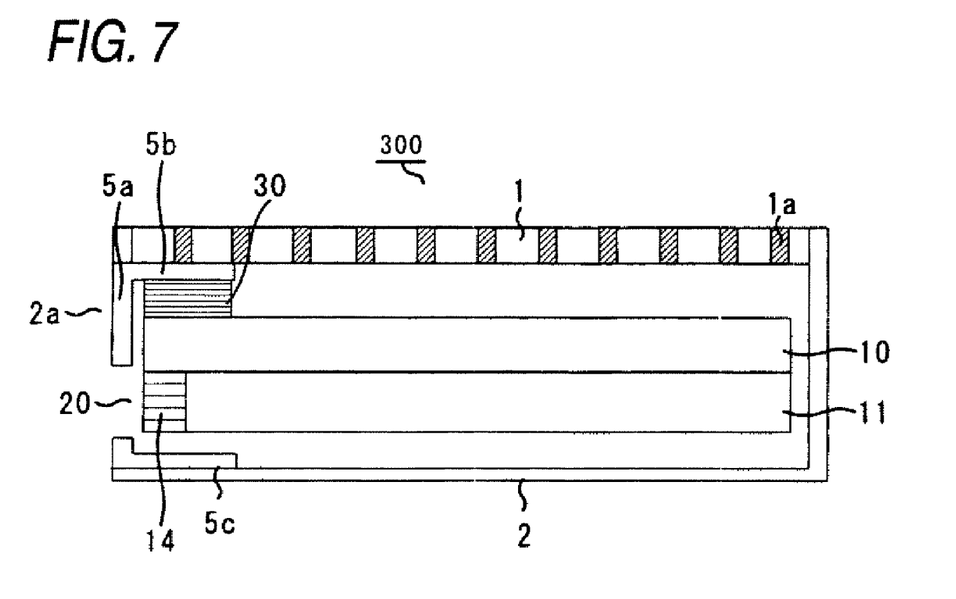
FIG. 7 is an exemplary sectional view illustrating a recording apparatus of a third embodiment.

Next, a recording apparatus 300 of a third embodiment of the invention will be described. FIG. 7 shows a sectional structure of the recording apparatus 300 in a position corresponding to a connector. The components which are similar to those in the first and second embodiments are denoted by the identical reference numerals, and their description will be omitted.

In the recording apparatus 300 of the third embodiment, as shown in FIG. 7, as a conductive member which is electrically connected and interposed between the metal plate 5 and the top cover 10, a spring 30 is placed between the horizontal plate 5b and the top cover 10. An example of the spring 30 used herein is a so-called coil spring in which a thin metal wire is helically wound.

As described above, also in the recording apparatus 300 of the third embodiment, the metal plate 5 and the metal surface (the top cover 10) of the recording medium unit (the HDD unit 3) are electrically connected to each other through the spring 30.

Similarly with the first and second embodiments, even when static electricity is generated in the vicinity of the connector 14, therefore, the static electricity is discharged to the top cover 10 through the metal plate 5 and the spring 30. Accordingly, as compared with the conventional structure, it is possible to remarkably prevent the semiconductor integrated circuits of the recording medium unit from being electrostatically broken. In addition, due to the elastic property of the spring, an impact which may be applied to the horizontal plate 5b is reduced, so that the structure can attain high impact resistance.

As described above, according to the embodiments of the invention, the resistance to electrostatic breakdown can be improved with a relatively simple configuration.

Figure 8:
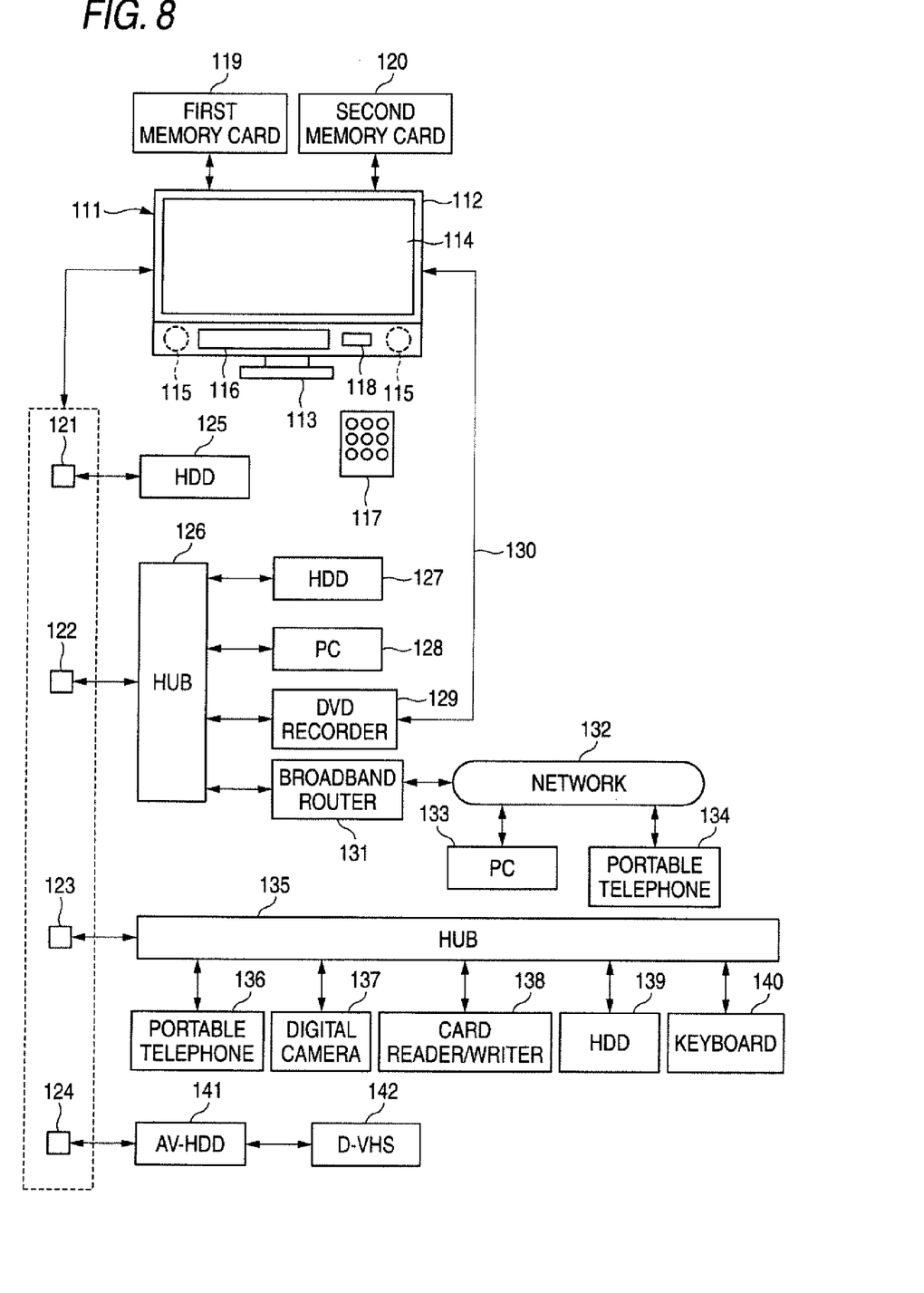
FIG. 8 is an exemplary diagram illustrating an external appearance of a broadcast receiving device of the embodiment.

An example of utilization of the above-described recording apparatus will be described. FIG. 8 schematically shows an example of the external appearance of a television broadcast receiving apparatus 111 on which the recording apparatus described in the respective embodiments is mounted.

Specifically, the digital television broadcast receiving apparatus 111 is mainly configured by a thin cabinet 112, and a supporting base 113 for supporting the cabinet 112 in its standing condition. In the cabinet 112, an image display apparatus 114 which is, for example, a flat panel display having a liquid crystal display panel, a pair of speakers 115, an operating portion 116, a light receiving portion 118 for receiving operation information transmitted from a remote controller 117, and the like are disposed.

A first memory card 119 such as an SD (Secure Digital) memory card, an MMC (Multimedia Card), or a memory stick is detachably attached to the television broadcast receiving apparatus 111. With respect to the first memory card 119, the recording and reproduction of information such as programs and photographs can be performed.

In addition, a second memory card (IC (integrated circuit) card) 120 in which, for example, contract information and the like are recorded is detachably attached to the television broadcast receiving apparatus 111. The reproduction of the contract information is performed on the second memory card 120.

The digital television broadcast receiving apparatus 111 comprises a first LAN (Local Area Network) terminal 121, a second LAN terminal 122, a USB (Universal Serial Bus) terminal 123, and an IEEE (Institute of Electrical and Electronics Engineers) 1394 terminal 124.

The first LAN terminal 121 is used as a port dedicated for a LAN-compatible HDD. The first LAN terminal is used for recording and reproducing information on and from a LAN-compatible HDD 125 which is a NAS (Network Attached Storage), through Ethernet (registered trademark).

As described above, by the provision of the first LAN terminal 121 as a port dedicated for a LAN-compatible HDD, the information recording of programs with a Hi-Vision image quality can be stably performed on the HDD 125 without being affected by the other network environments and the usage conditions of the network.

The second LAN terminal 122 is used as a general LAN-compatible port using Ethernet (registered trademark). The second LAN terminal is connected via, for example, a hub 126 to apparatuses such as a LAN-compatible HDD 127, a PC (Personal Computer) 128, and a DVD (Digital Versatile Disk) recorder 129 with a built-in HDD having a function of receiving digital broadcasting, and used for performing information transmission with these apparatuses.

With respect to the DVD recorder 129, the digital information transmitted via the second LAN terminal 122 is only the information of a control system. In order to transmit analog video and audio information with the digital television broadcast receiving apparatus 111, therefore, it is required to dispose a dedicated analog transmission path 130.

The second LAN terminal 122 can be connected to a network 132 such as Internet via a broadband router 131 connected to the hub 126, and is used for performing information transmission with various information terminals such as a PC 133 and a portable telephone 134 via the network 132.

The USB terminal 123 is used as a general USB-compatible port. The USB terminal is connected via a hub 135 to USB apparatuses such as a portable telephone 136, a digital camera 137, a card reader/writer 138 for a memory card, an HDD 139, and a keyboard 140, and used for performing information transmission with these USB apparatuses.

The IEEE 1394 terminal 124 is serially connected to an AV (audio video)-HDD 141, a D (digital)-VHS (Video Home System) 142, and the like each of which has a digital broadcast receiving function, and used for performing information transmission with these apparatuses.

Figure 9:
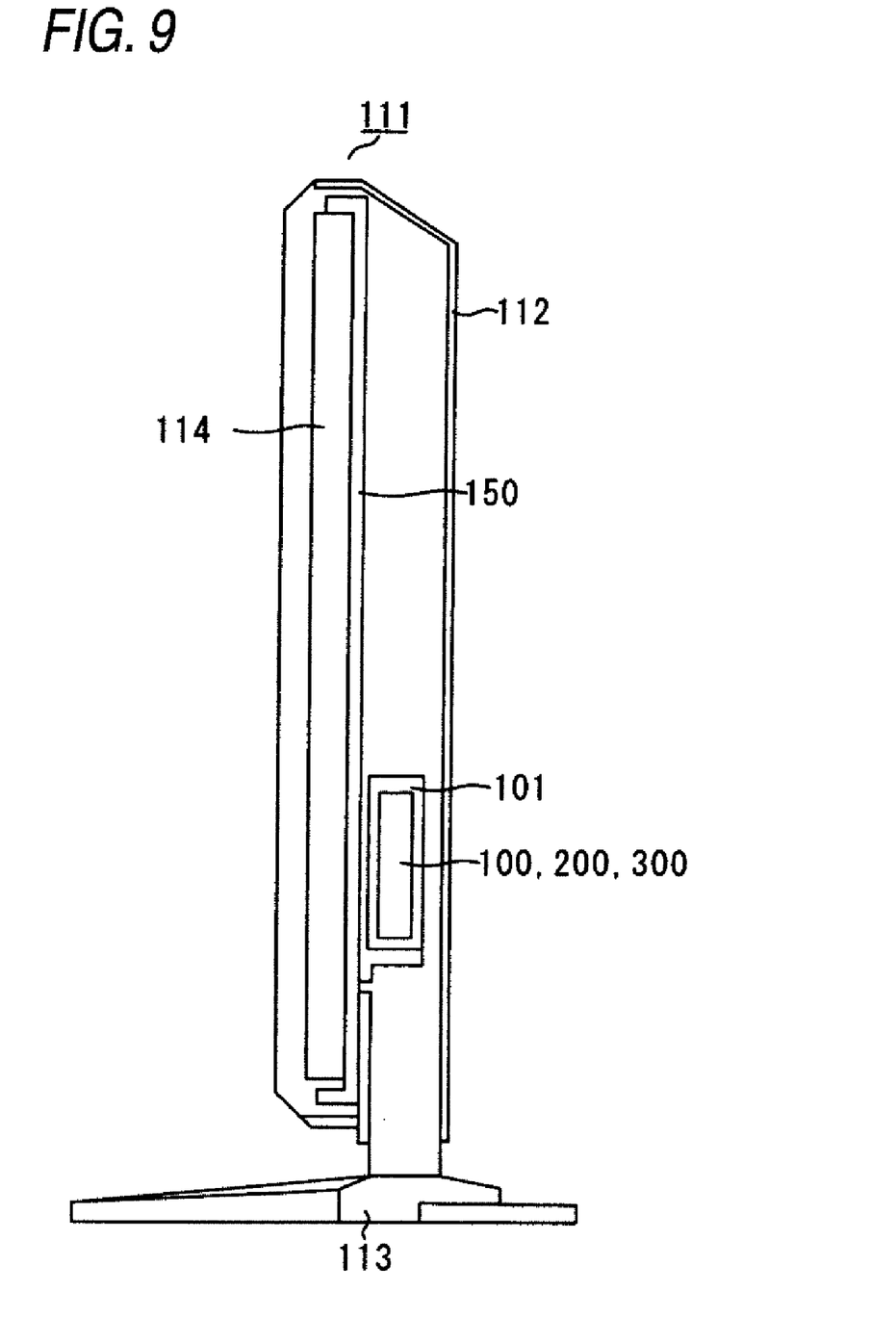
FIG. 9 is an exemplary view illustrating an external appearance of a side face of the broadcast receiving device of the embodiment.

FIG. 9 is a side view of the broadcast receiving apparatus 111. As shown in FIG. 9, the broadcast receiving apparatus 111 comprises a frame member 150, an image display device 114 attached to the frame member 150, the cartridge 101, and the recording apparatus 100, 200, or 300 which is detachably attached to the cartridge 101. Namely, the broadcast receiving apparatus 111 shown in FIG. 9 is a so-called television broadcast receiving apparatus with a built-in HDD. In the case where the capacity of the recording apparatus 100 is not enough, the user exchanges the recording apparatus 100, 200, or 300 in the cartridge 101 with another recording apparatus, so that the user can record a broadcast program into the new recording apparatus. As described above, the operation of exchanging a recording apparatus is required in the broadcast receiving apparatus 111 shown in FIG. 9, but the employed recording apparatus has the improved resistance to electrostatic breakdown. During the exchange operation of the recording apparatuses, therefore, it is possible to effectively prevent the recording apparatus from becoming unusable due to electrostatic breakdown.

Figure 10:
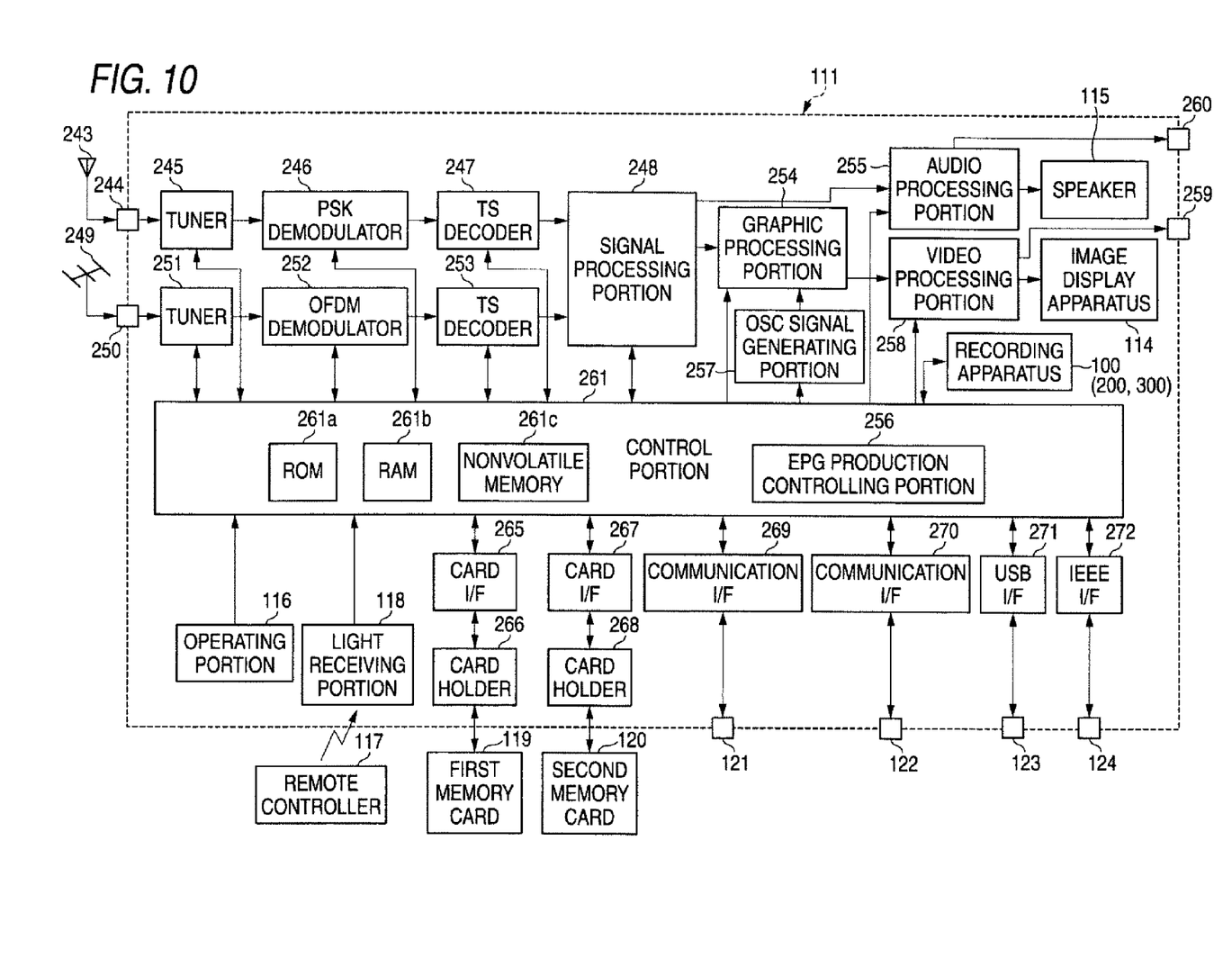
FIG. 10 is an exemplary diagram illustrating a main signal processing system of the broadcast receiving device of the embodiment.

FIG. 10 shows an example of a main signal processing system of the above-mentioned television broadcast receiving apparatus 111. Specifically, a satellite digital broadcast signal received through an antenna 243 for receiving digital BS/CS broadcasting is supplied to a tuner 245 for satellite digital broadcasting via an input terminal 244, whereby a broadcast signal of a desired channel is tuned.

The broadcast signal tuned by the tuner 245 is supplied to a PSK (Phase Shift Keying) demodulator 246, so that TS (Transport Stream) is demodulated. The TS is supplied to a TS decoder 247 to be decoded into a digital video signal, a digital audio signal, a digital data signal, and the like. Thereafter, the decoded signals are supplied to a signal processing portion 248.

A terrestrial digital television broadcast signal received by an antenna 249 for receiving terrestrial broadcasting is supplied to a tuner 251 for terrestrial broadcasting via an input terminal 250, whereby a broadcast signal of a desired channel is tuned.

The broadcast signal tuned by the tuner 251 is supplied to an OFDM (Orthogonal Frequency Division Multiplexing) demodulator 252, so that TS is demodulated. The TS is supplied to a TS decoder 253, so that the TS is decoded into a digital video signal, a digital audio signal, a digital data signal, and the like. Thereafter, the decoded signals are supplied to the signal processing portion 248.

In the television reception, the signal processing portion 248 selectively performs a predetermined digital signal process on the digital video and audio signals supplied from the TS decoders 247, 253, so that the processed results are supplied to a graphic processing portion 254 and an audio processing portion 255. The TS decoders 247, 253 supply data to an EPG production controlling portion 256 included in a control section 261.

The signal processing portion 248 and the TS decoders 247, 253 supply to the control section 261 various data for acquiring programs, electronic program guide (EPG) information, program attribute information (program genre, and the like), caption information (service information, SI, or PSI). The control section 261 includes a program table production control portion 290. The program table production control portion 290 produces an EPG from the input information. The control section 261 performs a image generation process for displaying an EPG and caption produced based on the program table production control portion 290, and supplies the generated image information to the graphic processing portion 254.

The graphic processing portion 254 has a function of superimposing an OSD signal generated in an OSD (On Screen Display) signal generating portion 257 on the digital video signal supplied from the signal processing portion 248, and outputting the resulting signal. The graphic processing portion 254 can selectively output one of the output video signal of the signal processing portion 248 and the output OSD signal of the OSD signal generating portion 257, and alternatively can output both of the output signals in a combination manner in which each of them constitutes a half of the screen.

The digital video signal output from the graphic processing portion 254 is supplied to the video processing portion 258. The video processing portion 258 converts the input digital video signal into an analog video signal of a format which can be displayed by the video display apparatus 114. Thereafter, the analog video signal is supplied to the video display apparatus 114 to display an image, and further supplied to the outside via an output terminal 259.

The audio processing portion 255 converts the input digital audio signal into an analog audio signal in a format which can be reproduced by the speakers 115. Thereafter, the analog audio signal is supplied to the speakers 115 for reproducing the sound, and further supplied to the outside via an output terminal 260. The television broadcast receiving apparatus 111 is provided with a clock 280 for indicating the current time.

In the television broadcast receiving apparatus 111, all of the operations thereof including the above-described various receiving operations are generally controlled by the control section 261. The control section 261 incorporates a CPU (Central Processing Unit) and the like, and receives operation information from the operating portion 116, or receives operation information from the remote controller 117 via the light receiving portion 118, so that the respective portions are controlled so as to reflect the operation contents.

In this case, the control section 261 mainly utilizes a ROM (Read Only Memory) 261a for storing control programs which are to be executed by the CPU, a RAM (Random Access Memory) 261b for providing a working area for the CPU, and a nonvolatile memory 261c in which various setting information, control information, and the like are stored.

The control section 261 is connected to a card holder 266 to which the first memory card 119 can be attached, via a card I/F (Interface) 265. Accordingly, the control section 261 can perform information transmission with the first memory card 119 attached to the cardholder 266, through the card I/F 265.

In addition, the control section 261 is connected to a card holder 268 to which the second memory card 120 can be attached via a card I/F 267. Accordingly, the control section 261 can perform information transmission with the second memory card 120 attached to the cardholder 268, through the card I/F 267.

The control section 261 is connected to the first LAN terminal 121 via a communication I/F 269. Accordingly, the control section 261 can perform information transmission with the LAN-compatible HDD 125 connected to the first LAN terminal 121, through the communication I/F 269. In this case, the control section 261 has a DHCP (Dynamic Host Configuration Protocol) server function, and control the LAN-compatible HDD 125 connected to the first LAN terminal 121 while assigning an IP (Internet Protocol) address to the HDD.

In addition, the control section 261 is connected to the second LAN terminal 122 via a communication I/F 270. Accordingly, the control section 261 can perform information transmission with the various apparatuses (see FIG. 1) connected to the second LAN terminal 122 through the communication I/F 270.

The control section 261 is connected to the USB terminal 123 via a USB I/F 271. Accordingly, the control section 261 can perform information transmission with the various apparatuses (see FIG. 1) connected to the USB terminal 123, through the USB I/F 271.

Moreover, the control section 261 is connected to the IEEE 1394 terminal 124 via an IEEE 1394 I/F 272. Accordingly, the control section 261 can perform information transmission with the various apparatuses (see FIG. 1) connected to the IEEE 124, through the IEEE 1394 I/F 272.

Although, in the above, the configuration where the recording apparatuses of the embodiments are used in the television broadcast receiving apparatus has been described, the recording apparatuses may be used in a PC, a DVD recorder, or the like. That is, the recording apparatuses of the embodiments may be applied to any electronic apparatus as far as the recording medium unit can be connected to the electronic apparatus.

Modifications

Figure 11:
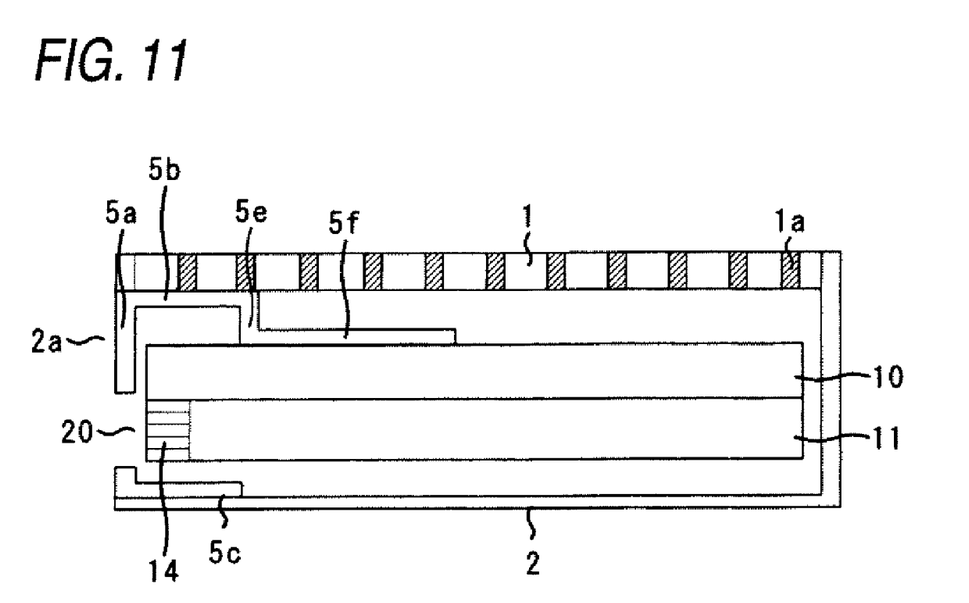
FIG. 11 is an exemplary sectional view illustrating a modification of the recording apparatus.

In the embodiments, the electric connection between the metal plate 5 and the HDD unit 3 is formed by using any conductive member. By changing the shape of the metal plate 5, the metal plate 5 and the HDD unit 3 can be configured so as to be directly connected to each other. As shown in FIG. 11, for example, an end portion of the horizontal plate 5b may be caused to stand substantially vertically, so that a vertical plate 5e which is parallel to the vertical plate 5a is provided, and a horizontal plate 5f which is continuous to a lower portion of the vertical plate 5e, and which is horizontally bent may be disposed.

According to the configuration, the metal plate 5 and the top cover 10 are electrically connected to each other, so that, even when static electricity is generated in the vicinity of the connector 14, the static electricity is discharged directly to the top cover 10 through the metal plate 5. As compared with the conventional structure, therefore, it is possible to prevent the semiconductor integrated circuits of the recording medium unit from being broken by the static electricity.

Figure 12A:
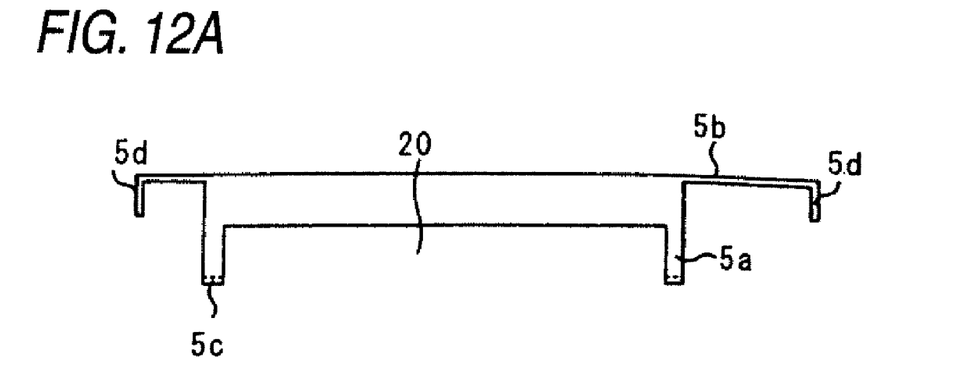
FIGS. 12A to 12C are exemplary front and sectional views illustrating modifications of a metal plate.

The invention is not limited to the above-described embodiments. In the process of carrying out the invention, the components may be modified and embodied without departing from the spirit of the invention. For example, the shape of the opening 20 of the metal plate 5 may be appropriately changed in accordance with the shape and position of the connector. Specifically, a plurality of openings 20 may be disposed in the vertical plate 5a, or the opening 20 may be extended up to the horizontal plate, as shown in FIG. 12A.

Figure 12B:
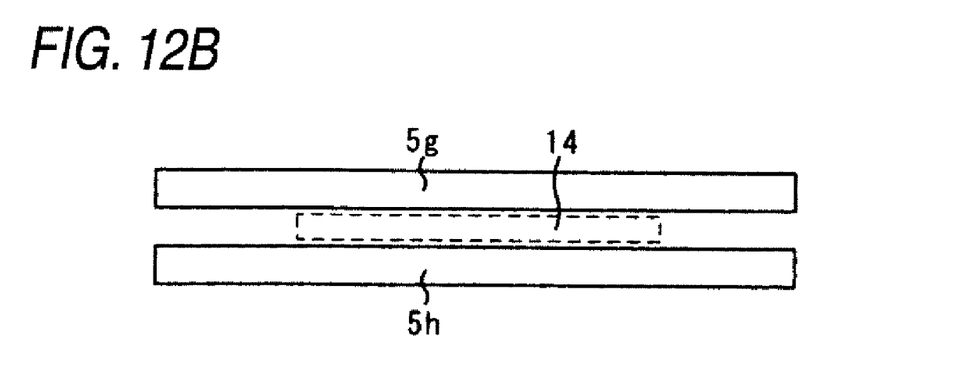

In the embodiments, the single metal plate 5 is disclosed. Alternatively, as shown in FIG. 12B, a plurality of metal plates which are mutually separated (a first metal plate 5g and a second metal plate 5h) may be placed in the vicinity of the connector 14. In the alternative, the connector 14 is exposed to the outside through a gap between the first metal plate 5g and the second metal plate 5h. In this case, in order to improve the resistance to electrostatic breakdown, it is preferred to form a configuration in which static electricity can be discharged from both of the first metal plate 5g and the second metal plate 5h. For example, each of the first metal plate 5g and the second metal plate 5h is electrically connected to the top cover 10 of the HDD unit 3 through or not through a conductive member.

Figure 12C:
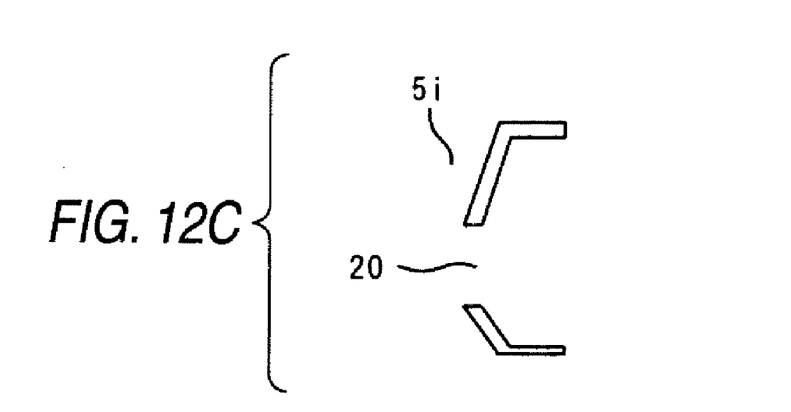

In the embodiments, the vertical plate 5a is disclosed. Alternatively, as shown in FIG. 12C, a metal plate 5i may be configured so as to have a metal portion which is inclined to the principal surface of the HDD unit 3. In this way, when the metal plate is placed in the vicinity of the connector 14, the connector 14 is placed so as to be exposed to the outside, and static electricity is discharged through the metal plate, the configuration of the metal plate such as the shape and position can be appropriately changed. In the embodiments, the metal plate and the top cover 10 of the HDD unit 3 are electrically connected to each other. Alternatively, the metal plate and the base chassis 11 can be electrically connected to each other. By appropriate combinations of plural components disclosed in the embodiments, various inventions can be configured. For example, some of the components can be omitted from all of the components shown in the embodiments. Moreover, the components in different embodiments can be appropriately combined.

As described with reference to the embodiment, there is provided a recording apparatus in which the resistance to electrostatic breakdown is improved, and a broadcast receiving apparatus comprising such a recording apparatus.

In the embodiment, the metal plate is disposed in the vicinity of the connector, and the metal plate and the metal face of the recording medium unit are electrically connected to each other. Even when static electricity is generated in the vicinity of the connector, therefore, the static electricity is discharged to the metal face of the recording medium unit through the metal plate. Therefore, as compared with the conventional structure, it is possible to prevent the recording apparatus from being electrostatically broken, and the reliability can be enhanced.

What is claimed is:

1. A recording apparatus comprising:
   a cover member including a metal face, the cover member housing a recording medium;
   a control circuit that controls recording onto and playback from the recording medium;
   a connector for performing data transfer with the recording medium, the connector being electrically coupled to the control circuit; and
   a metal plate including an opening for exposing a connecting portion of the connector, the metal plate being configured to cover a periphery of the connector except for the connecting portion,
   wherein the metal plate and the metal face of the cover member are electrically connected,
   wherein a shape of the connecting portion of the connector viewed from an exposed direction is formed in a rectangular shape, and
   wherein the metal plate covers the periphery of the connector from at least a shorter direction of the connecting portion having the rectangular shape.

2. The recording apparatus of claim 1, wherein the metal plate is disposed so as not to be in direct contact with the cover member.

3. The recording apparatus of claim 1, further comprising:
   a housing that houses the cover member and being formed with an opening that exposes a part of the metal plate and the connector.

4. The recording apparatus of claim 3, further comprising:
   a shock-absorbing member disposed between the cover member and the housing,
   wherein at least a part of the metal plate is disposed between the shock-absorbing member and the housing.

5. The recording apparatus of claim 3, wherein a slit is formed on a face of the housing facing the conductive member.

6. The recording apparatus of claim 1, wherein the metal plate includes a plurality of the metal plate pieces.

7. The recording apparatus of claim 1, wherein the cover member is configured to clamp the recording medium with a pair of box members, and the metal plate covers the periphery of the connector at least from a direction clamping the recording medium.

8. The recording apparatus of claim 1 further comprising:
   a conductive member that abuts both of the metal plate and the metal face,
   wherein the metal plate and the metal face of the cover member are electrically coupled through the conductive member.

9. A recording apparatus comprising:
   a cover member including a metal face, the cover member housing a recording medium;
   a control circuit that controls recording onto and playback of data from the recording medium;
   a connector for performing data transfer with the recording medium, the connector being electrically coupled to the control circuit;
   a metal plate including an opening for exposing a connecting portion of the connector, the metal plate being configured to cover a periphery of the connector except for the connecting portion, and
   a conductive member that abuts both of the metal plate and the metal face of the cover member,
   wherein the metal plate and the metal face of the cover member are electrically coupled through the conductive member.

10. The recording apparatus of claim 9, wherein the metal plate is disposed so as not to be in direct contact with the cover member.

11. The recording apparatus of claim 9 further comprising:
    a housing that houses the cover member and being formed with an opening that exposes a part of the metal plate and the connector.

12. The recording apparatus of claim 11 further comprising:
    a shock-absorbing member disposed between the cover member and the housing,
    wherein at least a part of the metal plate is disposed between the shock-absorbing member and the housing.

13. The recording apparatus of claim 11, wherein a slit is formed on a face of the housing facing the conductive member.

14. The recording apparatus of claim 9, wherein the metal plate includes a plurality of the metal plate pieces.

15. The recording apparatus of claim 9, wherein the cover member is configured to clamp the recording medium with a pair of box members, and the metal plate covers the periphery of the connector at least from a direction clamping the recording medium.

16. The recording apparatus of claim 9, wherein the conductive member is configured to include at least one of a tape member, a gasket, and a spring.

17. A recording apparatus comprising:
    a cover member including a metal face, the cover member housing a recording medium;
    a connector through which data is capable of being transferred to and from the recording medium, the connector including a connection portion adapted for connecting with an external apparatus; and
    a metal portion including an opening at a position facing the connecting portion of the connector,
    wherein the metal portion and the metal face of the cover member are electrically coupled together either directly or indirectly via a conductive member.

18. The recording apparatus of claim 17, wherein the metal portion covers a front face of the cover member except a region corresponding to the connecting portion of the connector.

19. The recording apparatus of claim 17, wherein the metal portion is disposed so that the opening is positioned outward the connecting portion of the connector.

20. The recording apparatus of claim 17, wherein the metal portion covers at least part of a side face of the cover member.

21. The recording apparatus of claim 17, wherein the metal portion is formed of a plurality of split metal plate pieces.

22. The recording apparatus of claim 17, wherein the metal portion covering a side face of the cover member is inclined with respect to the side face.

23. An electronic apparatus comprising a recording apparatus, the recording apparatus comprising:

a cover member including a metal face, the cover member housing a recording medium;
a connector through which data is transferred to and from the recording medium, the connector including a connection portion adapted for coupling with an external apparatus; and
a metal portion including an opening opened therein at a position facing the connecting portion of the connector,
wherein the metal portion and the metal face of the cover member are electrically coupled together.

24. The electronic apparatus of claim 23,
wherein the metal portion covers a front face of the cover member except a region corresponding to the connecting portion of the connector.

* * * * *